US012665481B2

(12) United States Patent
Schmid

(10) Patent No.: US 12,665,481 B2
(45) Date of Patent: Jun. 23, 2026

(54) LINEAR MOTOR

(71) Applicant: Compact Motion GmbH, Bern (CH)

(72) Inventor: Michael Schmid, Bern (CH)

(73) Assignee: COMPACT MOTION GMBH, Bern (CH)

( * ) Notice: Subject to any disclaimer, the term of this patent is extended or adjusted under 35 U.S.C. 154(b) by 169 days.

(21) Appl. No.: 18/649,603

(22) Filed: Apr. 29, 2024

(65) Prior Publication Data

US 2024/0372449 A1    Nov. 7, 2024

(30) Foreign Application Priority Data

May 2, 2023    (DE) ..................... 10 2023 111 322.4

(51) Int. Cl.
*H02K 41/03* (2006.01)
(52) U.S. Cl.
CPC .................................. *H02K 41/031* (2013.01)
(58) Field of Classification Search
CPC .................................................. H02K 41/031
See application file for complete search history.

(56) References Cited

U.S. PATENT DOCUMENTS

2008/0079522 A1    4/2008    Okada
2022/0166302 A1*    5/2022    Lin ...................... H02K 41/031

FOREIGN PATENT DOCUMENTS

DE    10259601 A1    7/2004
DE    10315655 A1    10/2004

* cited by examiner

*Primary Examiner* — Joseph Ortega
(74) *Attorney, Agent, or Firm* — LUCAS & MERCANTI, LLP; Klaus P. Stoffel

(57) ABSTRACT

A linear motor having a stator and an armature. The stator includes coils and a coil carrier. The armature includes permanent magnets. The coils impart a magnetic force to move the armature in a longitudinal direction relative to the stator within a movement path. The coils are held within a first longitudinal portion of the coil carrier. In a second longitudinal portion, the coil carrier is formed as or connected to a magnetic component having magnetic permeability at least 10 times greater than magnetic permeability in the first longitudinal portion. In certain positions of the armature on the movement path there is only a partial overlap between the magnetic component part and a longitudinal portion, which bears the permanent magnets, of the armature, resulting in a reluctance force that pulls the armature toward a rest position and/or compensates a force on the armature that counteracts the reluctance force.

11 Claims, 4 Drawing Sheets

LINEAR MOTOR

CROSS-REFERENCE TO RELATED APPLICATIONS

The present application claims priority of DE 10 2023 111 322.4, filed May 2, 2023, the priority of this application is hereby claimed, and this application is incorporated herein by reference.

BACKGROUND OF THE INVENTION

The invention relates to a linear motor having a stator and an armature, wherein either the stator comprises multiple coils and a coil carrier and the armature comprises multiple permanent magnets, or the armature comprises multiple coils and a coil carrier and the stator comprises multiple permanent magnets, wherein the armature is positively guided linearly with respect to the stator, wherein, by electrical energization of at least some of the coils, a magnetic force can be imparted to the armature, whereby the armature is movable in a longitudinal direction relative to the stator within a movement path, wherein the coil carrier holds the coils within a first longitudinal portion of the coil carrier.

In the field of automation technology, for example in pick-and-place systems, linear motors are commonly used to move tools which have a movement direction which is vertical or at least at an angle with respect to the horizontal plane. Since very low friction forces are typically achieved between an armature and a stator, the armature is pulled to its lowest position by gravitational force when the coils are electrically deenergized.

This position can be disadvantageous in some devices, and/or an uncontrolled movement can be problematic, for example if the intrinsic weight of the armature or the weight of components that are moved by the armature would result in a rapid movement as far a stop, because a high-speed impact against a stop can increase the wear of the device. Furthermore, a weight force acting on the armature must also be compensated during normal operation through suitable actuation of the coils, necessitating relatively complex control of the linear motor and potentially reducing the efficiency of the linear motor.

Therefore, in many applications, the weight force acting on the armature is compensated by an opposing force. This may be achieved by virtue of the armature being additionally supported on a frame or the like via a spring, by means of a counterweight and a diverting roller, or through the use of an additional actuator, for example a pneumatic or magnetic actuator. The additional components required for the force compensation however increase the structural space requirement, complexity and costs of the device that comprises the linear motor.

SUMMARY OF THE INVENTION

The invention is therefore based on the object of specifying a linear motor which exhibits improved operating behavior in relation to this, and which can be used in particular without external weight force compensation.

The object is achieved according to the invention by means of a linear motor of the type mentioned in the introduction, wherein, in a second longitudinal portion of the coil carrier that is situated outside the first longitudinal portion, the coil carrier is formed at least in part from at least one magnetic component part or is rigidly connected to the at least one magnetic component part, wherein the magnetic permeability of the magnetic component part is greater, at least by a factor of 10 or at least by a factor of 50, than the magnetic permeability of the coil carrier in the first longitudinal portion of the coil carrier, wherein, at least for some of the possible positions of the armature on the movement path, there is only a partial overlap in the longitudinal direction between the magnetic component part or at least one of the magnetic component parts and a longitudinal portion, which bears the magnets, of the armature or of the stator, resulting in a reluctance force which, when the coils are electrically deenergized, pulls the armature toward a specified rest position on the movement path and/or at least partially compensates a force on the armature, in particular a weight force, which counteracts the reluctance force.

Through the use, according to the invention, of at least one magnetic component part with relatively high magnetic permeability, the magnets that are required in any case for driving the linear motor can additionally be used to impart a restoring force, namely the reluctance force, when the coils are electrically deenergized. In this way, weight compensation can be realized without separate actuators, or other components external to the linear motor, being required for this purpose. This results in a smaller structural space requirement and lower costs than in the case of the known approaches for weight compensation that have been discussed in the introduction.

Depending on the dimensioning and arrangement of the magnetic component part, a reluctance force can be achieved which approximately compensates the weight force, such that the relatively low friction between armature and stator can suffice to hold the armature in its present position even when the coils are electrically deenergized.

Alternatively, through the provision of an adequately high reluctance force, the at least one magnetic component part can be pulled entirely, or at least as far as a stop of the armature, into the region of that longitudinal portion of the armature or of the stator which bears the magnets. This can serve, for example, for pulling the armature into its highest position in the event of an interruption of the power supply to the linear motor.

Through suitable shaping of the at least one magnetic component part, it is for example also possible to achieve that the armature is moved into the nearest of several cogging positions in the event of electrical deenergization, or the like.

The relative magnetic permeability of the coil carrier in the first longitudinal portion may in particular be less than 100 or less than 10 or less than 2. The coil carrier preferably consists, at least in the first longitudinal portion, of a non-ferromagnetic material. The relative magnetic permeability of said material is particularly preferably approximately 1. For example, a weakly paramagnetic or a diamagnetic material, for example aluminum, copper or plastics material or a plastics composite material, may be used as material of the coil carrier.

The use of a low magnetic permeability in the region of the first longitudinal portion of the coil carrier is expedient in particular if the coils are air coils which are formed without a yoke consisting of a material of high magnetic permeability. The use of coils each having a yoke, or the use of a material with high magnetic permeability in the region of the coils, can lead to cogging forces, which should be compensated through suitable actuation of the coils of the linear motor. Through the use of yokeless coils and a low magnetic permeability of the coil carrier in the region of the coils, such cogging forces can be at least substantially avoided in the linear motor according to the invention, whereby the positive characteristics of ironless linear motors can also be achieved for the linear motor according to the invention.

The magnetic component part may have a relative magnetic permeability of at least 40 or at least 100 or particularly preferably of greater than 300. The magnetic component part may in particular be ferromagnetic. However, it preferably exhibits low remanence in order to minimize magnetic hysteresis losses. For example, the magnetic component part may be formed from soft iron or dynamo sheet. To avoid eddy currents, the magnetic component part is preferably laminated.

When the linear motor is in the installed state, the longitudinal direction is preferably arranged at an angle of at least 30° or at least 60° with respect to the horizontal plane, and in particular runs vertically. As already discussed, the construction according to the invention of the linear motor is particularly advantageous for compensating weight forces that act on the armature.

The coil carrier may, at least in its first longitudinal portion, consist of exactly one material, and the magnetic component part may consist of exactly one further material. In this case, the magnetic permeabilities of the one material and of the further material can be directly compared. If the coil carrier, in the first portion, and/or the magnetic component part, are formed from multiple materials, the respective magnetic permeabilities may be averaged over respective volumes occupied by the at least one component part and by the first longitudinal portion of the coil carrier in order to allow the magnetic permeabilities to be compared.

The magnetic component part or at least one of the magnetic component parts may have different have different cross-sectional areas perpendicular to the longitudinal direction at multiple different positions in the longitudinal direction. The cross-sectional area may vary, in the longitudinal direction, by at least 10% or at least 30% or at least 50% of the maximum cross-sectional area that is achieved. In particular, the cross-sectional area of the particular magnetic component part may also decrease continuously to zero toward its rear end. In particular, the magnetic component part or at least a portion of the magnetic component part may be approximately wedge-shaped.

Additionally or alternatively, different numbers of the magnetic component parts may intersect respective section planes perpendicular to the longitudinal direction at multiple different positions in the longitudinal direction.

It has been found that, in the case of a constant cross section of the magnetic component part or in the case of a constant sum of the cross sections of the magnetic component parts in all section planes perpendicular to the longitudinal direction, the sequence of opposing magnetic fields in linear motors can result in cogging forces or fluctuations in the acting reluctance force for different movement positions of the armature. The presence of such cogging forces necessitates more complex actuation of the coils if it is sought to achieve a uniform movement of the armature, and can lead to lower efficiency of the linear motor. These disadvantages can be avoided or significantly reduced by the described approach.

The variations in the cross section can firstly, during a movement of the armature, result in a fluctuation of the spacing between the magnetic component part and permanent magnets arranged at the same height in a longitudinal direction, and thus of the reluctance force of the resulting magnetic circuit. Additionally or alternatively, owing to the variation of the cross section, different field-guiding cross sections of the component part perpendicular to the field direction of the field of said permanent magnets are provided in different longitudinal portions, which can likewise lead to a change in reluctance of respective local magnetic circuits during the movement of the armature.

If consideration is firstly given exclusively to the interaction of the magnetic component part with a single permanent magnet or with two permanent magnets situated opposite one another perpendicularly with respect to the longitudinal direction, and it is furthermore assumed that the magnetic component part is of infinite extent in the longitudinal direction, then the change in cross section would lead to force fluctuations or cogging forces during the movement. It has however been identified in the context of the invention that, if consideration is given to multiple permanent magnets or multiple permanent-magnet pairs and to boundary effects owing to the finite length of the magnetic component part, such a change in cross section results overall in a reduction in force fluctuations or cogging forces over the course of the movement path.

This applies in particular if the change in cross section is monotonous or has a sign which varies without periodicity or with a periodicity that differs from the periodicity of the fields of the permanent magnets in the longitudinal direction. The force fluctuations owing to the finite length of the magnetic component part and the periodicity of the fields of the permanent magnets are then superposed with the force fluctuations owing to the change in cross section, and partially cancel one another out, such that it is possible overall to achieve a smaller amplitude of the force fluctuations.

Additionally or alternatively, for at least two of the positions in the longitudinal direction, the extent of the magnetic component part or of at least one of the magnetic component parts in a direction of extent perpendicular to the longitudinal direction may differ by at least 10% or by at least 30% or by at least 50% of the maximum extent in the direction of extent. As already discussed above with regard to the change in cross section, both a change in the extent substantially parallel to the field profile of the fields of the permanent magnets and a change substantially perpendicular to the longitudinal direction and to the field direction result in additional reluctance forces that can overcome cogging forces that otherwise occur. For this purpose, it is sufficient to vary the extent of the magnetic component part in only one of these directions.

In particular, in a direction perpendicular to the longitudinal direction and to the direction of extent, the width of the magnetic component part may be substantially constant and may for example vary by only less than 5% or by less than 3%. A variation of the extent in only one direction can simplify the production of the coil carrier. For example, in this case, the magnetic component part can initially be produced separately and easily placed or pushed into a suitable depression or recess. It may then be held for example by clamping or adhesive bonding.

The extent of the magnetic component part may however also vary in both directions perpendicular to the longitudinal direction. A coil carrier having a magnetic component part of complex shape may be produced for example by virtue of the coil carrier or a component of the coil carrier being produced by injection molding, with the magnetic component part being placed into the injection molds, or the like.

The cross-sectional area of the magnetic component part or the sum of the cross-sectional areas of the magnetic component parts at the same position in the longitudinal direction may increase and decrease repeatedly, in particular periodically, in the longitudinal direction over a first sub-portion of the second longitudinal portion of the coil carrier. It has been found that such a shape can be particularly suitable for minimizing cogging forces or force fluctuations during the movement of the armature.

If a periodic variation is used, the periodicity should in particular be selected to be the periodicity of the fields of the permanent magnets in the longitudinal direction. The cross-sectional area or the sum of the cross-sectional areas may in particular vary by at least 5% or at least 10% of the maximum cross-sectional area or of the maximum of the sum. In particular, the cross-sectional area may be varied by way of an undulating variation of the extent of the magnetic component part in the direction of extent. Here, it is possible for only one side surface of the component parts to be of undulating shape in the direction of extent and for the opposite side to remain smooth, or for both oppositely situated side surfaces to be of undulating shape in the direction of extent.

At least for some of the possible positions of the armature on the movement path, there may be only a partial overlap in the longitudinal direction between the first sub-portion and that portion of the armature or of the stator which bears the magnets. In particular, the first sub-portion may, in all movement positions, project beyond the portion that bears the magnets, whereby boundary effects owing to the end of the periodic sequence of the magnetic fields of the perma-nent magnets can be at least partially compensated by way of the variations of the cross-sectional area or of the extent in the direction of extent.

The cross-sectional area of the magnetic component part or the sum of the cross-sectional areas of the magnetic component parts at the same position in the longitudinal direction may firstly monotonously decrease, in a second sub-portion of the second longitudinal portion of the coil carrier, in the longitudinal direction toward the first longi-tudinal portion of the coil carrier, and/or may secondly correspond to the sum of a first partial cross-sectional area, which decreases in the longitudinal direction toward the second longitudinal portion of the coil carrier, and a second partial cross-sectional area, which increases and decreases repeatedly, in particular periodically, in the longitudinal direction.

The second sub-portion may thus for example be wedge-shaped, or an additional undulation of the cross section or of the extent in the direction of extent may be superposed on a wedge shape. Boundary effects owing to the ending of that portion of the magnetic component part which projects into that portion of the stator or of the armature which bears the permanent magnets can be at least partially compensated by way of the monotonous decrease of the cross-sectional area or of the first partial cross-sectional area. Said compensation can potentially be further improved by way of an additional undulation.

The designation of the sub-portions as first and second sub-portions does not necessarily mean that both the first and the second sub-portion are present. It suffices for only the first or only the second sub-portion to be present.

The second sub-portion may be arranged between the first sub-portion and the first longitudinal portion of the coil carrier in the longitudinal direction. As already discussed above, the second sub-portion may in particular form that end of the magnetic component part which engages into that portion of the stator or of the armature which bears the permanent magnets.

If the stator comprises the multiple coils and the coil carrier, and the armature comprises the multiple permanent magnets, then in a preferred embodiment, the armature is formed as a closed hollow profile at least in that longitudinal portion of the armature which bears the permanent magnets, wherein, at least for some of the possible positions of the armature within the movement path, in particular for all possible positions of the armature within the movement path, the first longitudinal portion of the coil carrier engages into the hollow profile such that the first longitudinal portion of the coil carrier is completely surrounded by the closed hollow profile in at least one section plane perpendicular to the longitudinal direction, in particular in all section planes perpendicular to the longitudinal direction which extend through the first longitudinal portion of the coil carrier.

This embodiment achieves the advantage that the pre-dominant part of the interior space of the hollow profile in the first longitudinal portion of the coil carrier can be available for coils, whereby high forces can be achieved, owing to the good utilization of structural space, even in the case of a compact structural size. In particular, by means of a suitable hollow profile shape, even rectangular structural spaces can be optimally utilized.

At the same time, by arranging the permanent magnets on opposite sides of the hollow profile, it is possible to utilize air gaps or coils without a ferromagnetic yoke, whereby cogging forces or force fluctuations that occur over the movement path of the armature can be at least substantially avoided.

Since the permanent magnets are supported by a closed hollow profile, said permanent magnets are robustly sup-ported, and the a variations of the air gap width owing to a deformation of the yoke that bears the permanent magnets can be avoided.

The stator may be connected, at a first of its ends in the longitudinal direction, to a main body of the linear motor, which in particular comprises a set of control electronics of the linear motor. The main body may in particular serve for the mounting of the stator on other components, in particular on components of a device for industrial automation. For example, the main body may be attached to a frame of a machine or to an armature of a further linear motor of a pick-and-place system.

By virtue of the stator being held at one side on the main body, no support of the stator is required in the region of the armature. The armature can thus be designed, over its entire length or over at least 70% or at least 85% of its length, as a hollow profile without a slot or the like. Particularly good mechanical stability, and in particular good shielding with respect to the stray fields of the permanent magnets and coils, are thus achieved.

The armature may, at its end facing away from the main body in the longitudinal direction, have an end wall that closes off the interior space of the hollow profile toward this end. A further increase in the mechanical stability of the armature or of the hollow profile, and thus in particular of the regions that bear the permanent magnets, can thus be achieved, whereby, for example, despite the attraction force between permanent magnets arranged at opposite sides of the hollow profile, a substantially constant air gap can be achieved over the entire length and width of the stator longitudinal portion.

The end wall may be formed from a material with a relative magnetic permeability of close to 1, for example from aluminum or plastics material. Alternatively, the end wall may consist at least in part of a ferromagnetic material, for example of dynamo sheet or soft iron. It is thus poten-tially possible to achieve improved shielding, toward the free end of the armature, with respect to the magnetic fields of the permanent magnets and of the coils of the stator.

The end wall may in particular bear further components, for example a gripper and/or at least one other tool, in particular for industrial automation, specifically for a pick-and-place system. Alternatively and in addition, it is also possible for a further linear motor, or a sub-device comprising same, to be mounted on the end wall, for example in order to allow a movement in multiple dimensions.

The main body may have a linear guide which extends in the longitudinal direction outside the hollow profile and which interacts with the hollow profile, or with a carriage connected to the hollow profile, in order to positively guide the hollow profile in the longitudinal direction. The use of a linear guide which engages in particular externally on the armature is advantageous because, in this way, the width of an air gap between the armature and the stator can be kept substantially constant, the friction between these components can be minimized, and damage and/or wear to the permanent magnets can be avoided.

Alternatively or in addition, use may be made of a linear guide within the hollow profile, which linear guide may for example engage on at least one inner surface, which does not bear permanent magnets, of the armature or of the hollow profile.

At least for some of the possible positions of the armature within the movement path, in particular for all possible positions of the armature within the movement path, the second longitudinal portion of the coil carrier may engage into the hollow profile such that the second longitudinal portion of the coil carrier is completely surrounded by the closed hollow profile in at least one section plane perpendicular to the longitudinal direction. The second longitudinal portion of the coil carrier may in particular engage only partially into the hollow profile irrespective of the movement position. By means of the aforementioned embodiment, it can be achieved that the magnetic component part can, in all movement positions, provide a reluctance force in order to achieve a desired or defined behavior of the armature when the coils are electrically deenergized.

The first sub-portion is particularly preferably arranged within the hollow profile in all positions of the armature. It can thus be achieved in particular that the reluctance force that acts on the armature is at least approximately independent of the position of the armature.

The cross section of the hollow profile is preferably polygonal, in particular rectangular, wherein the permanent magnets are arranged on the inner side of the hollow profile on mutually opposite walls. The field lines of mutually opposite permanent magnets may in this case pass through the interior space of the hollow profile in particular substantially perpendicularly with respect to at least one of the walls that bear the permanent magnets. Coils of the stator whose windings extend approximately parallel to said wall or said walls can thus be passed through by field lines without the use of a yoke, such that a ferromagnetic or strongly paramagnetic yoke can be omitted, and the advantages of an ironless linear motor can be achieved.

The coils preferably extend, in a direction perpendicular to the opposite walls or to one of the opposite walls, over at least 50% or 70% of the minimum spacing of the oppositely situated walls. In particular, a small air gap of less than 1 mm, for example of 0.5 mm, may remain between the permanent magnets and the stator, in particular between the permanent magnets and a coil carrier, which bears the coils, of the stator. The coils may extend as far as this air gap, or may be spaced from said air gap only by a relatively thin wall of the coil carrier, which may for example have a wall thickness of less than 1 mm, for example of 0.5 mm. In this way, the available structural space is at least approximately optimally utilized by the coils, and relatively high longitudinal forces can be generated even with linear motors of relatively small construction.

The permanent magnets may be arranged on the relevant wall in succession in a longitudinal direction in the form of a Halbach array or with alternating polarities. The stator is thus passed through by magnetic fields with opposite field directions in alternation in the longitudinal direction, such that, by suitable electrical energization of the coils, forces can be selectively imparted in both directions in the longitudinal direction in order to drive the armature.

The coils of the stator are in particular assigned to three different phases, wherein the coils assigned to each phase can be electrically energized conjointly. If multiple coils are used for each phase, a phase group comprising one coil of the first phase, one coil of the second phase and one coil in the third phase is in particular followed, in the longitudinal direction, by a further such phase group, such that the different phases cyclically alternate in the longitudinal direction.

In tests, it has been found that the arrangement as a Halbach array is advantageous in most usage situations. In this arrangement, between magnets which are successive in the longitudinal direction and which have opposite field directions substantially perpendicular to the longitudinal direction, use is made of in each case one magnet with a field direction parallel or antiparallel with respect to the longitudinal direction. Stray fields are thus minimized, and the efficiency of the linear motor and the force that the linear motor can provide can generally thus be further increased. A direct alternation of the field directions may however also be desired in some cases.

The inner side of each of the opposite walls of the hollow profile is preferably formed by a ferromagnetic material at least in a region that bears the permanent magnets. The ferromagnetic material can in this case act as a yoke via which the field lines of the permanent magnets can be closed at that side of the permanent magnets which faces away from the stator. In this way, the stray fields of the permanent magnets can be minimized, and the magnetic resistance of the magnetic circuit formed by permanent magnets of opposite polarity which are arranged on the relevant wall in succession in the longitudinal direction can be reduced. This contributes to an increase in efficiency and in the forces that can be imparted by the linear motor.

Preferably, those portions of the hollow profile which connect the magnet-bearing walls are formed from a non-ferromagnetic material, because ferromagnetic material in these portions could reduce the field strength in the region of the coils of the stator.

In one preferred embodiment, this may be implemented by virtue of the hollow profile comprising a magnet carrier which consists of the ferromagnetic material and which forms the inner side of each of the opposite walls of the hollow profile at least in the region that bears the permanent magnets, wherein the magnet carrier is attached to a main body of the hollow profile, wherein the main body consists of a material with a relative magnetic permeability of less than 100 or less than 10 or less than 2, wherein the stator longitudinal portion is completely surrounded by the main body at least in the at least one section plane perpendicular to the longitudinal direction, in particular in all section planes perpendicular to the longitudinal direction which extend through the stator longitudinal portion.

The main body may even itself form a hollow profile, wherein the magnet carriers may be arranged on two opposite inner surfaces of the main body. The main body may in particular have, in the region of these inner surfaces, in each case one longitudinal guide into which the magnet carrier can be inserted in the longitudinal direction during the production of the armature. Said insertion may take place in particular only after the permanent magnets have been arranged on the magnet carrier. The permanent magnets may be held on the magnet carrier by magnetic force and/or may be adhesively bonded thereto. The magnet carrier may have, in particular on its side facing away from the main body, depressions which partially receive respective permanent magnets. In this way, the permanent magnets can be precisely arranged with little effort during the course of the production of the armature.

Through the use of a closed hollow profile for bearing the permanent magnets, the field lines of each permanent magnet can be guided, at both sides of the stator, to the respectively oppositely situated permanent magnet, whereby, in relation to the use of U-shaped or C-shaped yokes, saturation of the yoke would occur only in the case of considerably smaller material thicknesses or only in the case of considerably higher field strengths. Thus, in particular in conjunction with the high mechanical stability achieved by means of the closed profile, a material saving and thus also a weight and structural space saving are achieved, or, with the same expenditure on materials, higher forces can be provided by the linear motor.

The hollow profile or the magnet carrier may in particular consist of a laminated material. For example, dynamo sheet or laminated soft iron may be used as material for the magnet carrier or the closed hollow profile.

The coil carrier may have, in its second longitudinal portion, at least one, in particular groove-like, recess in which the magnetic component part or at least in each case one of the magnetic component parts is received. The magnetic component part may for example be of planar or rod-like form. The connection of the magnetic component part to the coil carrier may be achieved for example by clamping or adhesive bonding.

The aforementioned design makes it possible in particular for the magnetic component part to be produced independently of the coil carrier. In this way, it is for example possible for the same coil carrier to be used for different applications, in which different weight forces are to be compensated by the reluctance force. An adaptation to the forces that are to be compensated can be achieved by attaching a different number of magnetic component parts to the coil carrier, or by using differently shaped magnetic component parts.

Aside from the linear motor according to the invention, the invention relates to a device having a linear motor, wherein, in at least an operational state of the device, the linear motor is arranged such that the longitudinal direction runs at an angle of at least 30° or at least 60° with respect to the horizontal plane, in particular vertically. The device may be used in particular for industrial automation purposes, or may be a device for handling parts, for example a pick-and-place system. In such devices, an armature commonly moves in a region below the stator and, when the coils are electrically deenergized, should be held at a constant height or pulled upward in the direction of the stator. The embodiment of the linear motor according to the invention is thus particularly advantageous in these applications.

The at least one magnetic component part may be designed and arranged such that, at least for some of the possible positions of the armature on the movement path, in particular for all possible positions of the armature on the movement path, the sum of the reluctance force and of either a weight force or a force component of the weight force running parallel to the longitudinal direction is lower than static friction and/or sliding friction that counteracts the movement of the armature along the movement path. The weight force that is to be compensated may in this case result either exclusively from the weight of the armature itself or from the overall weight of the armature and of the components that are moved by the armature. By means of the aforementioned embodiment, a movement of the armature when the coils are electrically deenergized can be suppressed, or an occurring movement can even be stopped.

It is alternatively also possible, through suitable selection of the embodiment and/or arrangement of the at least one magnetic component part, for the reluctance force to be made high enough that the armature is either moved as far as a stop or moved into a particular reference position.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
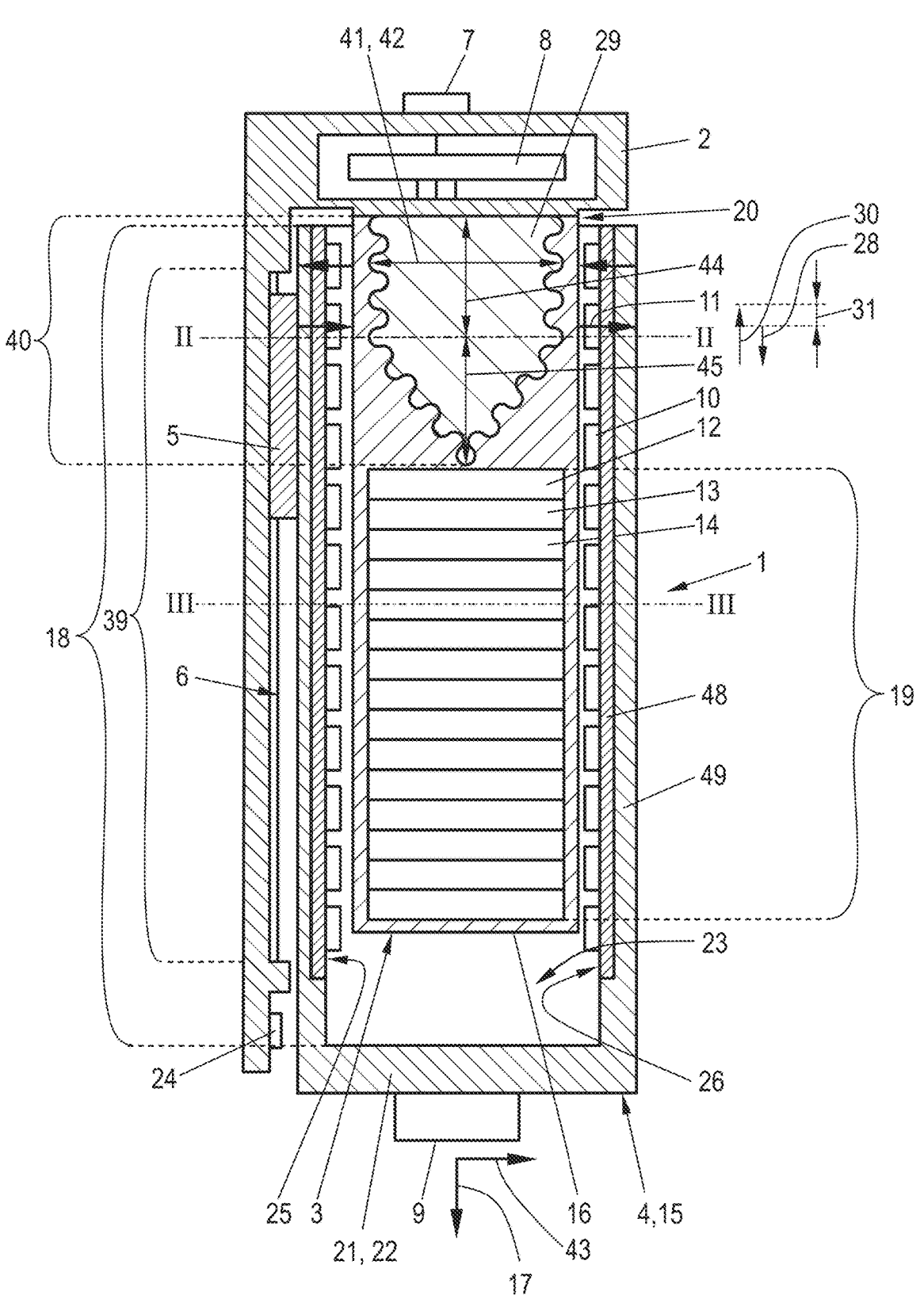
FIG. 1 an exemplary embodiment of a linear motor according to the invention, FIGS. 2 and 3 different sectional detail views of the linear motor shown in FIG. 1, FIG. 4 a sectional detail view of a further exemplary embodiment of the linear motor according to the invention, FIG. 5 a sectional detail view of a coil carrier of a further exemplary embodiment of the linear motor according to the invention, FIGS. 6 and 7 magnetic component parts that can be arranged in respective recesses of the coil carrier illustrated in FIG. 5.

FIG. 1 shows a sectional view of a linear motor 1. The linear motor 1 may for example be part of a pick-and-place system or of some other industrial automation device, the further components of which are not illustrated. For this purpose, the linear motor 1 may for example be attached by way of its base 2 to a static component or to a moving component, and the armature 4 may bear other components 9, for example a gripper and/or some other tool.

In the example, the linear motor comprises a stator 3, which at its end 20 is held on the base 2, and an armature 4, wherein the stator 3 comprises multiple coils 12, 13, 14 which are held on a coil carrier 16 in a first longitudinal portion 19 of said coil carrier. The armature 4 bears multiple permanent magnets 10. The coils 12, 13, 14 are in particular assigned to three phases of the linear motor 1 and capable of being electrically energized separately. The sequence of the coils 12, 13, 14 repeats several times in the longitudinal direction 17.

In alternative embodiments, the coils 12, 13, 14 could instead be arranged on the armature 4, with the permanent magnets 10 arranged on the stator 3.

In the example, the armature 4 is positively guided linearly with respect to the stator 3 by means of a linear guide 6 and a carriage 5. By electrical energization of at least some of the coils 12, 13, 14, a magnetic force can be imparted to the armature 4, whereby the armature 4 is movable in a longitudinal direction 17 relative to the stator 3 within a movement path 39.

The main body 2 can be used to hold the linear motor 1 on a frame or on some other device and, in the example, has the set of control electronics 8 and a connection 7 for the control of the linear motor 1. In order to allow exact positioning of the armature 4, it may be advantageous to use a position sensor 24 which detects the movement position of the armature 4 in a conventional manner, for example using a Hall sensor.

In pick-and-place systems and other applications, the longitudinal direction 17 of the linear motor 1 may in particular coincide with the vertical direction or may at least be inclined relative to the horizontal plane. In this case, a weight force 30 acts on the armature 4, which weight force, in the example, leads said armature away from the base 2 in the longitudinal direction 17. Owing to the typically low friction between the stator 3 and the armature 4, the armature 4 would, without further measures, slide downward along the entire length of the movement path 39, and the carriage 5 would impact at relatively high speed against the stop of the linear guide 6.

To avoid this, a special design of the linear motor 1 is utilized, which results in a reluctance force 30 on the stator 4. Depending on the specific design of the linear motor 1, the reluctance force 30 may be much higher than the weight force 28, to an extent sufficient that the armature 4 is moved into a specified rest position at the upper end of the movement path 39 when the coils 12, 13, 14 are electrically deenergized. The linear motor 1 is however particularly preferably designed such that the sum 31 of reluctance force 30 and weight force 28 is lower than the static friction between the armature 4 and the stator 3, or is even lower than the sliding friction between the armature 4 and the stator 3, such that the armature 4 is held in its present position in the absence of electrical energization.

The generation of this reluctance force 30 in the linear motor 1 results from the fact that, in a second longitudinal portion 40 of the coil carrier 16 that is situated outside the first longitudinal portion 19, the coil carrier 16 is formed in part from a magnetic component part 29, wherein the magnetic permeability of the magnetic component part 29 is greater, at least by a factor of 10 or at least by a factor of 50, than the magnetic permeability of the coil carrier 16 in the first longitudinal portion 19 of the coil carrier 16.

In particular, the relative magnetic permeability of the coil carrier 16 in the first longitudinal portion 19 may be selected to be close to 1, for example by virtue of the coil carrier 16 consisting of plastics material or aluminum there. This may be advantageous in order to consequently obtain air gaps in the region of the coils or obtain the behavior of an ironless linear motor, in which cogging forces owing to yokes of coils, such as are used in other linear motor types, can be avoided.

In the example, the magnetic component part 29 is formed from a ferromagnetic material with low remanence, for example from laminated soft iron or from dynamo sheet. Since, for all positions of the armature 4 on the movement path 39, the magnetic component part 29 extends in the longitudinal direction 17 beyond a longitudinal portion 18, which bears the magnets, of the armature 4, the interaction of the magnetic component part 29 with the permanent magnets 10, which are provided on the armature 4 in any case, leads to the generation of the reluctance force 30.

Figure 2:
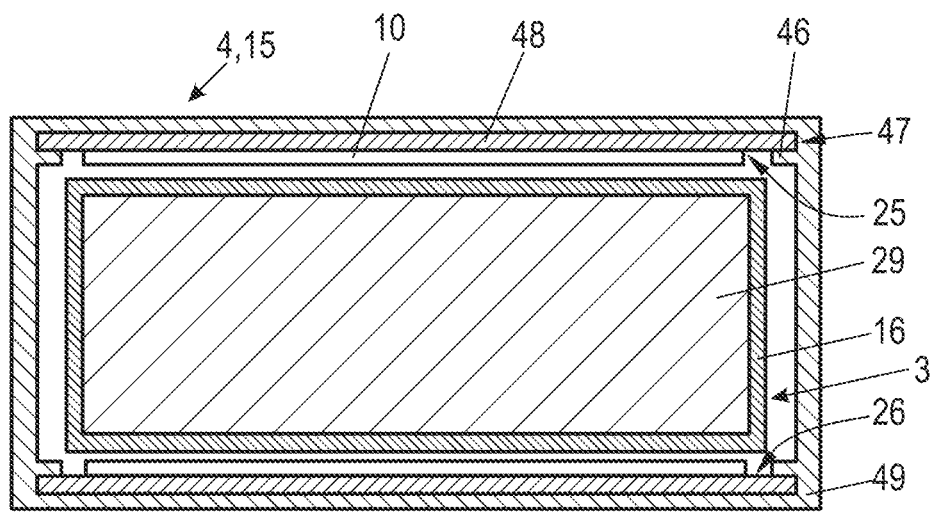
Figure 3:
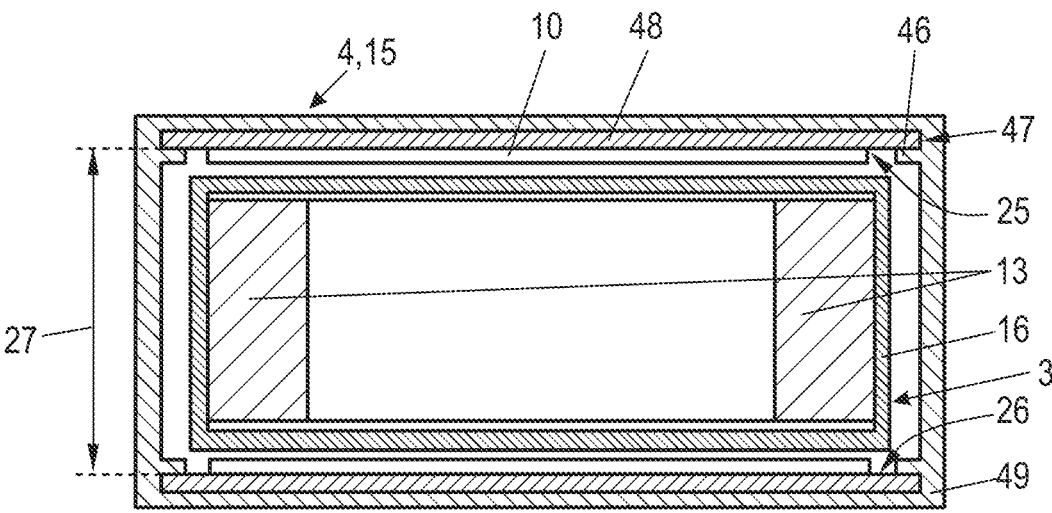

As can be clearly seen in particular in FIG. 2, which shows a section along the line II-II in FIG. 1, and FIG. 3, which shows a section along the line III-III in FIG. 1, the armature 4 in the example shown is formed as a closed hollow profile 15, on the opposite walls 25, 26 of which the permanent magnets 10 are arranged. In the illustrated position of the armature 4 relative to the stator 3, the hollow profile 15 surrounds the coil carrier 16 over a major part of its length, and in particular completely in the illustrated section planes II-II and III-III. The hollow profile 15 is additionally stabilized by the end wall 22 arranged at its end 21. Said end wall closes off the interior space 23 of the hollow profile 15 and may optionally also provide shielding with respect to the fields of the permanent magnets 10 and/or of the coils 12, 13, 14.

In the example, the hollow profile 15 comprises a main body 49 composed of a material with a relative magnetic permeability of close to 1, which may for example consist of aluminum or plastics material. Arranged on opposite inner surfaces of said main body are magnet carriers 48 composed of a ferromagnetic material, for example of dynamo sheet. As can be seen in the sectional views in FIG. 2 and FIG. 3, projections 46 are formed in the region of each inner surface of the main body 49, giving rise to a linear guide 47 for each magnet carrier 48, via which linear guide said magnet carrier can, during the production of the armature 3, be pushed into the armature 3 from the open end 20 of said armature and fixed, for example adhesively bonded, in the pushed-in state.

The magnet carrier 48 forms a yoke for the permanent magnets 10, via which the field lines of the permanent magnets 10 can be closed, with low magnetic resistance, at the side facing away from the stator. Through the use of such a yoke, an increase in efficiency of the linear motor 1 is achieved, and potentially disruptive stray fields in the surroundings of the motor are reduced.

Owing to the illustrated geometry, the coils 12, 13, 14 can, as illustrated in FIG. 3 for the coil 13, fill a major part of the intermediate space 27 between the walls 25, 26 on which the permanent magnets 10 are arranged. As can likewise be seen in FIG. 3, the coils 12, 13, 14 are designed as air coils without a yoke.

As illustrated in FIG. 1 by way of the arrows 11, the permanent magnets 10 are arranged with alternating polarity on the opposite walls 25, 26 of the hollow profile 15. Alternatively, an arrangement as a Halbach array would for example be possible.

In both cases, the result is a magnetic field, which is at least approximately periodic in the longitudinal direction, in the longitudinal portion 18 of the armature. In the case of a cuboidal design of the magnetic component part 29, this would, owing to boundary effects, lead to an intensely fluctuating reluctance force 30 during the movement of the armature 4. To avoid this, a different shape of the magnetic component part 29 is used in the example shown.

As can be seen in FIG. 1, the magnetic component part 29 specifically has different extents 42 in the direction of extent 43, and thus also different cross-sectional areas 41 perpendicular to the longitudinal direction 17, at multiple different positions in the longitudinal direction 17.

Here, in a first sub-portion 44, the extents 42 vary periodically. In a second sub-portion 45, this periodic variation is combined with a taper toward that end of the magnetic component part 29 which faces away from the base 2. Therefore, in the region of that end of the magnetic component part 29 which faces away from the base, the approximate result is a wedge shape, whereby boundary effects owing to the ending of the magnetic component part 29 in that longitudinal portion 39 of the armature which bears the permanent magnets 10, and resulting cogging forces during the movement of the armature 4, are substantially suppressed.

Figure 8:
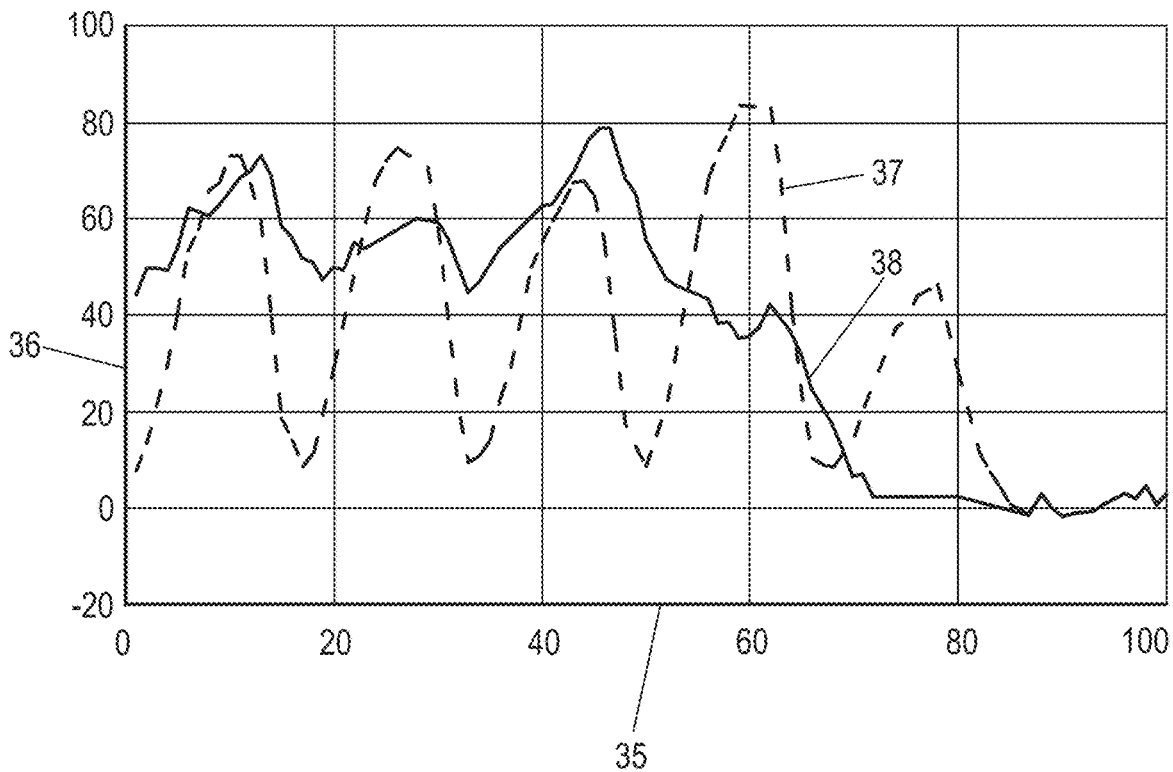
FIG. 8 is a graph showing the effect of a wedge shape in the second sub-portion.

The effect of such a wedge shape in the second subportion 45 is shown by way of example, disregarding the additional periodic variation of the cross-sectional areas 41 in the sub-portions 44, 45, in FIG. 8. Here, the position of the armature on the movement path 39, which is 100 mm in length in the example, is shown on the x-axis 36, and the reluctance force 30 that is achieved when the coils 12, 13, 14 are electrically deenergized is shown, in newtons, on the y-axis 36.

A reluctance force profile according to the curve 37 results the case of very short wedges or in the case of an approximately rectangular shape, wherein the simulation on which the curve 37 is based used a spacing of the permanent magnets 10 of 33 mm and a length of the second sub-portion, or of the wedge, of 1 mm. Intense fluctuations of the reluctance force 30, and thus high cogging forces, occur here.

The curve 38 shows the profile in the case of the wedge or the second sub-portion being lengthened to 16.5 mm, that is to say approximately to the spacing of two permanent magnets. The fluctuations in the reluctance force 30 are already considerably reduced here.

Whilst the force fluctuations can be reduced further through the use of longer second sub-portions, a lengthening of the second sub-portion beyond twice the spacing of the permanent magnets, or four times the spacing in the case of a Halbach array, does not lead to any further reduction in the variation of the reluctance force. The remaining variation results primarily from effects in the region of the upper end of the hollow profile 15, which serves as a yoke for the permanent magnets 10.

In order that fluctuations in the reluctance force 30 that result herefrom are also reduced, it is additionally the case in the example that undulating side walls of the magnetic component part 29 are used in both sub-portions 44, 45. In the case of a substantially constant thickness of the magnetic component part 29 perpendicular to the plane of the image in FIG. 1, the variations of the extents 42 lead to a correspondingly varying cross-sectional area 41.

Figure 4:
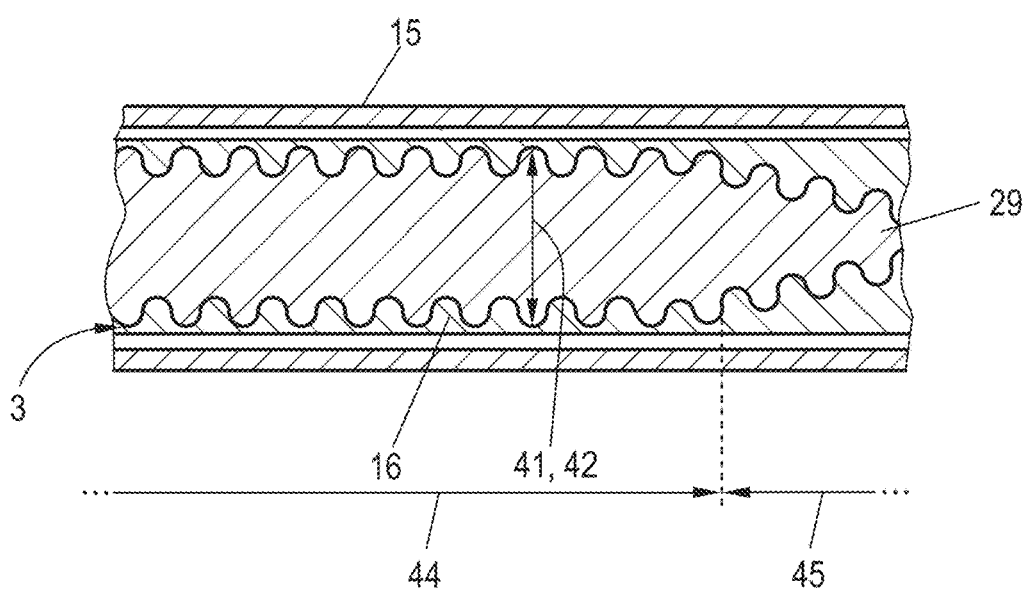

FIG. 4 shows a detail view of a linear motor 1, which has been modified in relation to the linear motor shown in FIG. 1, in the region of the second longitudinal portion 40 of the coil carrier 16. The section plane of the illustration in FIG. 4 is perpendicular to the plane of the image in FIG. 1, such that the permanent magnets are not illustrated in FIG. 4 because they lie in front of the plane of the image or are concealed by the coil carrier 16.

In the exemplary embodiment shown in FIG. 4, the variations of the cross-sectional areas 41 are achieved by virtue of the extent 41 of the magnetic component part 29 varying in a direction of extent that is at least approximately perpendicular to the field lines of the permanent magnets 10 and parallel to the walls 25, 26, which bear the permanent magnets 10, of the hollow profile 15.

A variation of the extent 41 in this direction does not lead to a variation of the gap between the permanent magnets 10 and the magnetic component part 29. However, reduction of the flux-guiding cross section of the magnetic component part 29 in the relatively narrow sections nevertheless results in a variation of the reluctance for the magnetic circuit of a permanent-magnet pair when the armature 3, and thus the magnetic component part 29, is moved relative to the permanent magnets 10 in the longitudinal direction 17, which extends horizontally in FIG. 4.

A further possible embodiment of a linear motor 1 or of the coil carrier 16 thereof for the purposes of providing a reluctance force 30 for the aforementioned purposes will be discussed below with reference to FIGS. 5 to 7. Here, the coil carrier 16 shown in FIG. 5 and the magnetic component parts 33, 34 shown in FIG. 6 and FIG. 7 are firstly manufactured as separate components.

Figure 6:
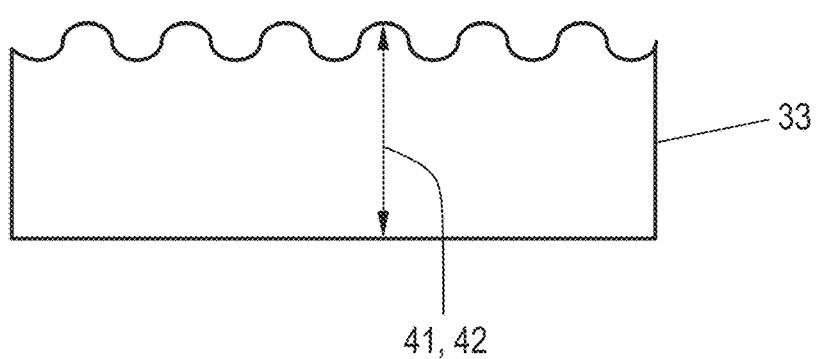
Figure 7:
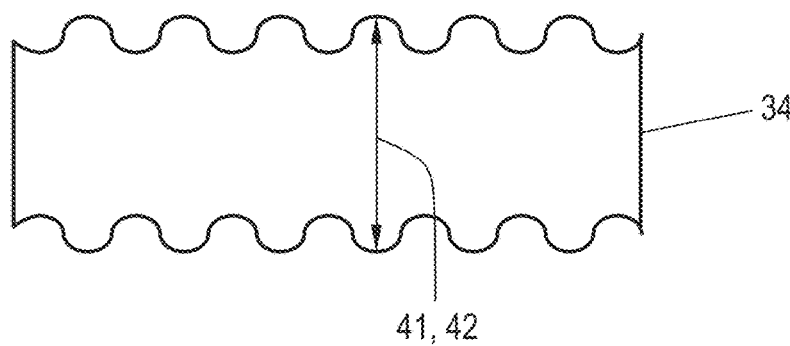

In its second longitudinal portion 40, the coil carrier 16 has groove-like recesses 32 into which the magnetic component parts 33, 34 shown in FIG. 6 and FIG. 7 can be placed. The magnetic component parts 33, 34 may be fastened in the respective recesses 32 by adhesive bonding, for example.

Figure 5:
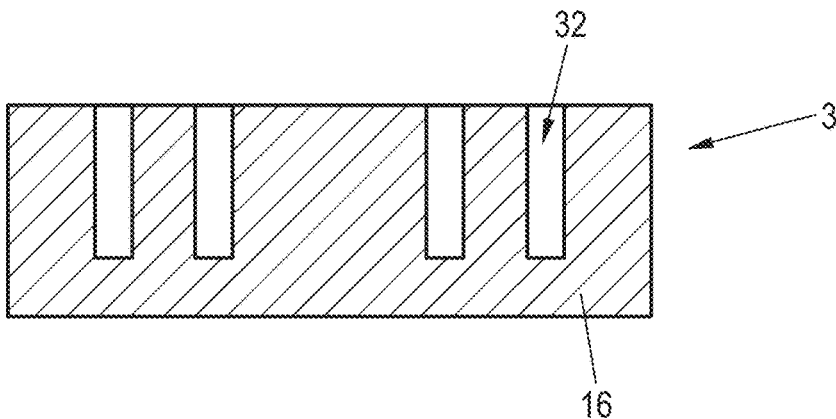

It is pointed out that the illustrations in FIGS. 5 to 7 are not true to scale, and the magnetic component parts 33, 34 are preferably designed such that each magnetic component part 33, 34 is received entirely in the relevant recess 32, and does not protrude beyond the coil carrier 16.

By virtue of the magnetic component parts 33, 34 being produced separately, these can be easily produced in virtually any desired shape, for example by being stamped out of a metal sheet. Furthermore, by varying the number of magnetic component parts 33, 34 attached to the coil carrier 16, and/or the shapes and/or positions of said component parts in the longitudinal direction, it is possible for the reluctance force 30 and the profile of the reluctance force 30 during the movement of the armature to be adapted as required, such that, for example, a stronger or weaker reluctance force 30 can be provided depending on the mass that is attached to the armature 4.

While specific embodiments of the invention have been shown and described in detail to illustrate the inventive principles, it will be understood that the invention May be embodied otherwise without departing from such principles.

I claim:

1. A linear motor having a stator and an armature, wherein either the stator comprises multiple coils and a coil carrier and the armature comprises multiple permanent magnets, or the armature comprises multiple coils and a coil carrier and the stator comprises multiple permanent magnets, wherein the armature is positively guided linearly with respect to the stator, wherein, by electrical energization of at least some of the coils, a magnetic force can be imparted to the armature, whereby the armature is movable in a longitudinal direction relative to the stator within a movement path, wherein the coil carrier holds the coils within a first longitudinal portion of the coil carrier, wherein, in a second longitudinal portion of the coil carrier that is situated outside the first longitudinal portion, the coil carrier is formed at least in part from at least one magnetic component part or is rigidly connected to the at least one magnetic component part, wherein a magnetic permeability of the magnetic component part is greater, at least by a factor of 10 or at least by a factor of 50, than the magnetic permeability of the coil carrier in the first longitudinal portion of the coil carrier, wherein, at least for some of the possible positions of the armature on the movement path, there is only a partial overlap in the longitudinal direction between the magnetic component part or at least one of the magnetic component parts and a longitudinal portion, which bears the permanent magnets, of the armature or of the stator, resulting in a reluctance force which, when the coils are electrically deenergized, pulls the armature toward a specified rest position on the movement path and/or at least partially compensates a force on the armature, in particular a weight force, which counteracts the reluctance force.

2. The linear motor according to claim 1, wherein the magnetic component part or at least one of the magnetic component parts has different cross-sectional areas perpendicular to the longitudinal direction at multiple different positions in the longitudinal direction, and/or in that different numbers of the magnetic component parts intersect respective section planes perpendicular to the longitudinal direction at multiple different positions in the longitudinal direction.

3. The linear motor according to claim 1, wherein, for at least two of the positions in the longitudinal direction, an extent of the magnetic component part or of at least one of the magnetic component parts in a direction of extent perpendicular to the longitudinal direction differs by at least 10% or by at least 30% or by at least 50% of a maximum extent in a direction of extent.

4. The linear motor according to claim 1, wherein a cross-sectional area of the magnetic component part or a sum of the cross-sectional areas of the magnetic component parts at a same position in the longitudinal direction increases and decreases repeatedly, in particular periodically, in the longitudinal direction over a first sub-portion of the second longitudinal portion of the coil carrier.

5. The linear motor according to claim 4, wherein a second sub-portion is arranged between the first sub-portion and the first longitudinal portion of the coil carrier in the longitudinal direction.

6. The linear motor according to claim 1, wherein a cross-sectional area of the magnetic component part or a sum of the cross-sectional areas of the magnetic component parts at a same position in the longitudinal direction firstly monotonously decreases, in a second sub-portion of the second longitudinal portion of the coil carrier, in the longitudinal direction toward the first longitudinal portion of the coil carrier, and/or secondly corresponds to the sum of a first partial cross-sectional area, which decreases in the longitudinal direction toward the first longitudinal portion of the coil carrier, and a second partial cross-sectional area, which increases and decreases repeatedly, in particular periodically, in the longitudinal direction.

7. The linear motor according to claim 1, wherein the stator comprises the multiple coils and the coil carrier, and the armature comprises the multiple permanent magnets, wherein the armature is formed as a closed hollow profile at least in that longitudinal portion of the armature which bears the permanent magnets, wherein, at least for some of the possible positions of the armature within the movement path, in particular for all possible positions of the armature within the movement path, the first longitudinal portion of the coil carrier engages into the hollow profile such that the first longitudinal portion of the coil carrier is completely surrounded by the closed hollow profile in at least one section plane perpendicular to the longitudinal direction, in particular in all section planes perpendicular to the longitudinal direction which extend through the first longitudinal portion of the coil carrier.

8. The linear motor according to claim 7, wherein, at least for some of the possible positions of the armature within the movement path, in particular for all possible positions of the armature within the movement path, the second longitudinal portion of the coil carrier engages into the hollow profile such that the second longitudinal portion of the coil carrier is completely surrounded by the closed hollow profile in at least one section plane perpendicular to the longitudinal direction.

9. The linear motor according to claim 1, wherein the coil carrier has, in the second longitudinal portion, at least one, in particular groove-like, recess in which the magnetic component part or at least in each case one of the magnetic component parts is received.

10. A device having a linear motor according to claim 1, wherein, in at least an operational state of the device, the linear motor is arranged such that the longitudinal direction runs at an angle of at least 30° or at least 60° with respect to a horizontal plane, in particular vertically.

11. The device according to claim 10, wherein the at least one magnetic component part is designed and arranged such that, at least for some of the possible positions of the armature on the movement path, in particular for all possible positions of the armature on the movement path, a sum of the reluctance force and of either a weight force or a force component of the weight force running parallel to the longitudinal direction is lower than static friction and/or sliding friction that counteracts the movement of the armature along the movement path.

* * * * *